Nov. 23, 1926.
1,608,313
J. T. HELBERT
CABLE CUTTER FOR FISHING TOOLS
Original Filed August 17, 1923
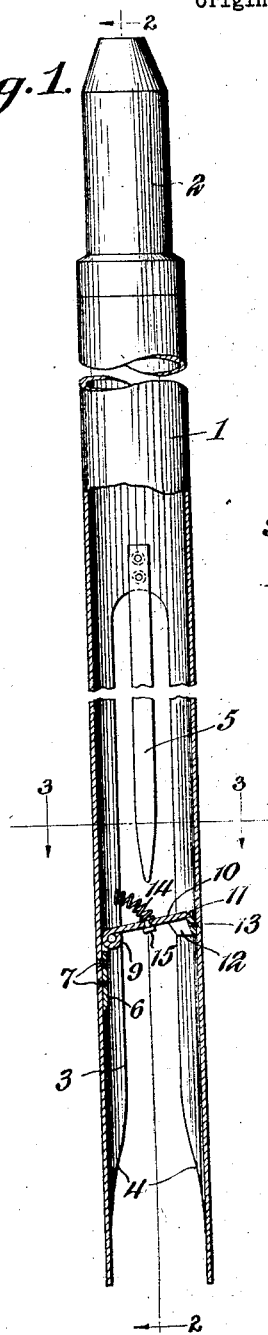
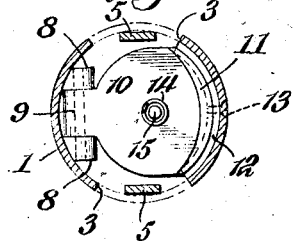
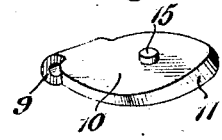
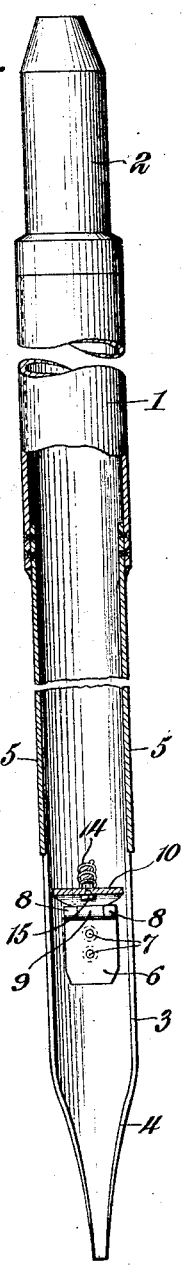
WITNESSES
C. L. McDonald.
Howard D. Orr.
INVENTOR
John T. Helbert
BY
E. G. Siggers
ATTORNEY Patented Nov. 23, 1926.

1,608,313

UNITED STATES PATENT OFFICE.

JOHN T. HELBERT, OF BROADWAY, VIRGINIA.

CABLE CUTTER FOR FISHING TOOLS.

Original application filed August 17, 1923, Serial No. 657,892. Divided and this application filed May 2, 1925. Serial No. 27,569.

This invention relates to cable cutting attachments for fishing tools used in wells for the purpose of catching or grabbing a broken off drilling cable to effect the removal thereof from the well, together with the tools carried thereby. The present application is a division of an application filed by me on August 17, 1923, Serial No. 657,892.

The object is to provide simple, strong and efficient means which may be mounted to operate within the well casing to sever the frayed or unravelled end of the broken cable, which has been left in the bottom of the well attached to the drilling tools, etc., the said cutter acting automatically to engage the cable ends below the frayed or separated strands and make the cut at a point where the latter will remain in their originally twisted condition, and in position to be grasped by grab or clutch means carried by the fishing tool to remove the same from the well.

A full and complete understanding of the invention may be obtained from a consideration of the following detailed description, taken in connection with the accompanying drawing forming a part of this specification, it being understood that while the drawing shows a practical form of the invention, the latter is not to be confined to strict conformity with the showing thereof, but may be changed or modified, so long as such changes or modifications mark no material departure from the salient features of the invention, as specifically pointed out in the appended claims.

In the drawings, in which similar reference characters designate corresponding parts throughout the several figures:—

Figure 1 is a side elevation of the device, parts being shown in section.

Figure 2 is a similar view, taken at right angles to Figure 1 on the line 2—2 thereof.

Figure 3 is a transverse section taken on the line 3—3 of Figure 1.

Figure 4 is a detail perspective view of the cutting member.

In drilling wells it frequently happens that the drilling cable breaks below the surface of the ground, and it becomes necessary, in order to continue the drilling operations, to remove the broken cable, together with the tool or tools connected thereto, from the well. Many devices have been designed for this purpose, but the great objection to the same has been that, in case the broken end of the cable is frayed or unravelled, as is generally the case, a firm grip cannot be obtained by the grab or clutch means referred to, on the unequal and separated strands of the cable, and it has been found that by making a clean, new cut of the cable below the same, where the strands are left intact and in their originally twisted condition, that the removal of the broken cable and lost tools is greatly facilitated.

It is with these facts in view that I have designed the present invention, which constitutes means for cutting off the frayed end of the cable in a well, so that it may be subsequently gripped by a clutch member to be afterward employed in connection with the device, it being understood that the cutting member is to be used first, and then removed from the carrying means, and the clutch member afterwards placed in operative position therein and lowered into the well to engage the said cable and lift the same out.

Referring to the drawing, I have shown the body of the device as comprising a cylindrical, tubular body member 1, which has its upper portion somewhat reduced, as indicated at 2, and capable of being suspended by the usual means, whereby it may be lowered into the well from which the drilling cable and tools are to be removed. This member is usually constructed about eight feet long, and for a considerable portion of its length, the opposite sides of the body are slotted, as shown at 3, to provide a certain degree of resiliency, and the ends between the slots are preferably somewhat tapered at their opposite sides, as indicated at 4.

In order to prevent the frayed end of the broken cable from entering between the body member 1 and the inner wall of the well casing, I provide guards which are formed of resilient strips 5, secured at their upper ends upon the inner wall of the body member and at the upper ends of the slots 3, the said strips extending part way along said slots and nearly to the cutting member, which is located adjacent to the lower ends of the arms provided by the slots 3.

The cutting member comprises an attaching plate 6 secured to the inner side of the body member by means of removable screws 7, said plate being formed with hinge eyes 8, between which is pivoted an ear 9 formed on a disc 10, which is provided along its curved edge opposite to the hinge eyes, with a cutting edge 11, the upper corner of the disc being beveled back to locate the cutting edge on a plane with the lower face of the disc. This cutting edge is adapted to cooperate with the inner, upper cutting edge of an arcuate shoulder or ledge 12, detachably secured in place on the inner wall of the body member 1 and opposite the aforesaid hinge element, by screws 13.

The disc 10 carries a coiled spring 14 of curved form and having one end secured to the center of the disc by a bolt 15 or other suitable fastener, the other, free end of the spring being adapted to engage against the inner wall of the body member, when the disc is elevated or swung about its hinge pin, to prevent the disc from remaining in an upright position and to return it to its normal seat upon the ledge and transversely of the body member.

Suitable grab or clutch mechanism, not shown, is to be mounted in the body member at a point above the upper ends of the opposite slots 3, and since this mechanism forms the subject matter of the hereinbefore mentioned application, no illustration or description of the same is made herein.

With the cutting member in position and resting upon the said ledge 12, and assuming that the drill cable has become broken, the tool is lowered into the well until it reaches a sufficient depth for the frayed or unravelled ends of the strands of the cable to be received within the lower end of the body member. As this end of the cable enters the body member, the disc 10 will be moved upwardly about its hinge pintle, and after a sufficient amount of the cable has entered, an upward pull or quick movement is given to the suspending cable for the tool, with the result that the broken cable will be cramped between the sharp upper edge of the ledge 12 and the cutting edge 11 of the disc 10, and, as the weight of the cable and the drilling tool or tools connected thereto comes on the broken cable, the cutting edges will sever the same, the frayed or unravelled portion remaining above and upon the disc which immediately closes, when the device is hauled out of the well. The cut-off end of the cable is removed, the screws 7 and 13 also removed and the plate 6, disc 10 and ledge 12 taken out entirely when the above-mentioned clutch or grab means is applied within the upper portion of the barrel or body member 1, and the tool again lowered into the well for engagement with the cable therein for the purpose of rescuing the latter.

In some instances, it may be necessary to cut away the entire cable, step by step, until the drilling tools carried thereby are reached so that they may be removed from the well by any of the well known types of grapples provided for the purpose. The present device operates equally well when this is necessary, as the clutch or grab member will be left out of the operation entirely, and the cutting disc and ledge used to perform the repeated severing of the cable.

From the foregoing it will be seen that a simple, strong and efficient means has been provided for severing cables in well casings which may be readily operated to engage the cable by simply lowering the device thereonto and by a quick upward movement to cause the cutting elements to act.

What is claimed is:—

1. In a tool of the character described, an elongated hollow body with longitudinal slots extending upwardly from the lower end, cutting mechanism mounted within said body at the slotted portion, and guards secured upon the inner periphery of the body and extending along said slots and terminating above the cutting mechanism.

2. In a tool of the character described, an elongated hollow body slotted at the lower end, a ledge detachably mounted against the inside thereof and having a cutting edge, an attaching plate detachably mounted within the opposite side of the body, and a swingable disk pivoted to said attaching plate and cooperating with said ledge and having a cutting edge.

3. In a device of the character described, an elongated hollow body member, a ledge mounted therein and having a cutting edge, a swinging cutting member pivoted to the interior of the body and having a cutting edge cooperating with said cutting ledge, and a curved coiled spring rigidly secured to the cutting member at a point between the pivot and the cutting edge and having its free end projecting therefrom and adapted to engage with the body when the cutting member is moved upwardly and prevent the cutting member remaining in an upright position and thereby causing the cutting member to return to its cutting position upon the ledge.

In testimony, that I claim the foregoing as my own, I have hereto affixed my signature.

JOHN T. HELBERT.